No. 815,918. PATENTED MAR. 20, 1906.
G. H. JONES.
FRAME FOR MOTOR PROPELLED VEHICLES.
APPLICATION FILED JULY 14, 1905.

WITNESSES:
Chas. F. Clagett
Chas. L. Wolf

INVENTOR
George Hill Jones
BY his ATTORNEY
Charles A. Stephens

UNITED STATES PATENT OFFICE.

GEORGE HILL JONES, OF PHILADELPHIA, PENNSYLVANIA.

FRAME FOR MOTOR-PROPELLED VEHICLES.

No. 815,918. Specification of Letters Patent. Patented March 20, 1906.

Application filed July 14, 1905. Serial No. 269,609.

*To all whom it may concern:*

Be it known that I, GEORGE HILL JONES, a citizen of the United States, and a resident of Philadelphia, in the county of Philadelphia and State of Pennsylvania, have invented certain new and useful Improvements in Frames for Motor-Propelled Vehicles, of which the following is a specification.

My invention relates to motor-propelled vehicles, particularly to a frame combining a gear-casing and cross-tie for motor-propelled vehicles.

It is essential in motor-propelled vehicles that all parts should be rigid, strong, and well protected from dust and dirt, and especially is this necessary in high-speed touring-machines, as the rough usage to which they are subjected tends to shake the parts loose and the dust and dirt from the roads over which they travel would clog up the gears and reduce the speed of the machine.

The object of this invention is therefore to improve the construction of motor-propelled vehicles in these and other important respects by providing an integral rigid frame cast or otherwise constructed to form a cross-tie for connecting and bracing the side reaches and a casing for the gears which has a removable cap.

A further object of this invention is to provide a frame of the character described embodying advantages in point of simplicity, inexpensiveness, lightness, and durability such as is consistent with the successful accomplishment of the first-mentioned object—viz., that of making the frame rigid and strong and protecting the parts from dust and dirt.

Figure 1:
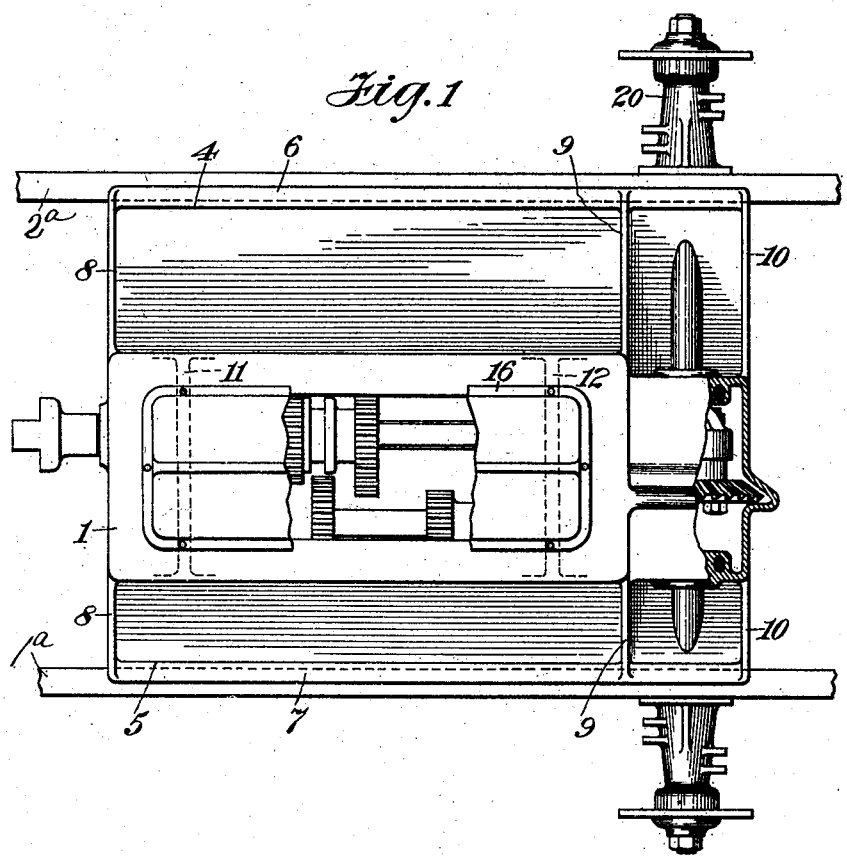
Figure 2:
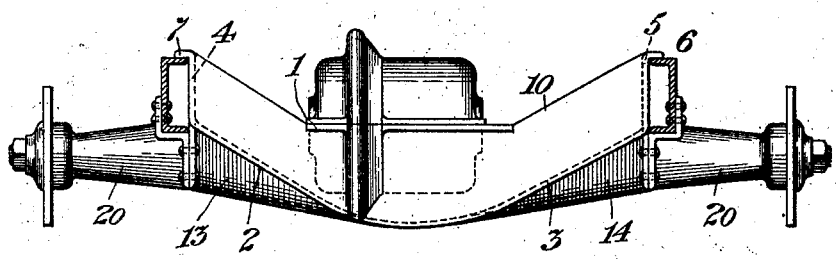

In the drawings, Figure 1 is a plan view of the frame, the cap being partly broken away; and Fig. 2 is an end view.

In both the figures of the drawings illustrating my invention like reference characters designate corresponding parts.

Referring to the drawings, 1$^a$ and 2$^a$ designate the side reaches of an automobile running-gear formed of suitably-shaped channel-irons. My improved frame is supported upon and between the side reaches of the running-gear and serves to firmly connect and brace said reaches at that end against twisting and bending. The frame comprises a central upwardly-extending gear-casing 1, closed at the bottom, ends, and sides and open at the top to give access to the parts within; a bottom consisting of portions 2 and 3, extending laterally from the lower edges of the side walls of central casing; side plates 4 and 5, extending upwardly from the outer edges of the bottom portions and having laterally-extending flanges 6 and 7 on their upper edges adapted to rest on top of the side reaches of the running-gear frame; upwardly-extending webs or braces 8, 9, and 10 on each side of the central casing connecting the side walls thereof and the side plates, the webs 8 and 10 forming the ends of the frame; partitions 11 and 12 within the central casing parallel with the webs and coacting therewith to brace the frame; semi-cylindrical portions 13 and 14, extending downwardly from the bottom portions 2 and 3 and forming casings for the sprocket-shaft, and a cap 16, removably secured over the open top of the central casing. The sprocket-hangers 20 are secured to the outer ends of the portions 13 and 14 and to the side channel-irons or reaches 1 and 2.

The gearing forms no part of this invention and is therefore only shown to demonstrate the use of the frame.

Having now described my invention, what I claim as new, and desire to secure by Letters Patent, is—

1. In a motor-propelled vehicle, an integral frame comprising a central gear-casing having a bottom, sides and ends, side plates, bottom portions connecting the bottom of the gear-casing with the lower edges of the side plates, and ribs connecting the side of the central casing, the side plates and bottom plates, substantially as described.

2. In a motor-propelled vehicle, an integral frame comprising a central gear-casing having a bottom, sides and ends, side plates, bottom portions connecting the bottom of the gear-casing with the lower edges of the side plates, ribs connecting the sides of the central casing, the side plates and bottom plates, and sprocket-shaft casings extending downwardly from the bottom portions, substantially as described.

3. In a motor-propelled vehicle, an integral frame comprising a central gear-casing having a bottom, sides and ends, side plates, bottom portions connecting the bottom of the gear-casing with the lower edges of the side plates, ribs connecting the sides of the central casing, the side plates and bottom portions, sprocket-shaft casings extending downwardly from the bottom portions, and a removable cap forming the top of said central casing, substantially as described.

4. In a motor-propelled vehicle, an integral frame comprising a central gear-casing having a bottom, sides and ends, side plates, bottom portions connecting the bottom of the gear-casing with the lower edges of the side plates, sprocket-shaft casings extending downwardly from the bottom portions, and a removable cap forming the top of the central casing, substantially as described.

5. In a motor-propelled vehicle, an integral frame comprising a central gear-casing having a bottom, sides and ends, side plates, bottom portions connecting the bottom of the gear-casing with the lower edges of the side plates, ribs connecting the sides of the central casing, the side plates and bottom portions, sprocket-shaft casings extending downwardly from the bottom portions, and sprocket-hangers secured to the outer ends of said sprocket-shaft casings, substantially as described.

6. In a motor-propelled vehicle, an integral frame comprising a central gear-casing having a bottom, sides and ends, side plates, bottom portions connecting the bottom of the gear-casing with the lower edges of the side plates and bottom portions, sprocket-shaft casings extending downwardly from the bottom portions, sprocket-hangers secured to the outer ends of said sprocket-shaft casings and a removable cap forming the top of the central casing, substantially as described.

7. In a motor-propelled vehicle, an integral frame comprising a central gear-casing having a bottom, sides and ends, side plates having flanges, bottom portions connecting the bottom of the gear-casing with the lower edges of the side plates, ribs connecting the sides of the central casing, the side plates and bottom plates, and sprocket-shaft casings extending downwardly from the bottom portions, substantially as described.

8. In a motor-propelled vehicle, an integral frame comprising a central gear-casing having a bottom, sides and ends, side plates having flanges, bottom portions connecting the bottom of the gear-casing with the lower edges of the side plates, ribs connecting the sides of the central casing, the side plates and bottom portions, sprocket-shaft casings extending downwardly from the bottom portions, and sprocket-hangers secured to the outer ends of said sprocket-shaft casings, substantially as described.

Signed at Philadelphia, in the county of Philadelphia and State of Pennsylvania, this 1st day of July, A. D. 1905.

GEORGE HILL JONES.

Witnesses:
ALBERT B. BLACKWOOD,
JOHN S. WURTS.